United States Patent
Lord et al.

(10) Patent No.: US 9,120,018 B2
(45) Date of Patent: Sep. 1, 2015

(54) SYSTEM AND METHOD FOR SELF-EVIDENT MULTIUSER CONTENT

(75) Inventors: Shawn Lord, Austin, TX (US); Andre Arsenault, Austin, TX (US)

(73) Assignee: Daybreak Game Company LLC, San Diego, CA (US)

( * ) Notice: Subject to any disclaimer, the term of this patent is extended or adjusted under 35 U.S.C. 154(b) by 1721 days.

(21) Appl. No.: 12/507,659

(22) Filed: Jul. 22, 2009

(65) Prior Publication Data
US 2010/0075761 A1 Mar. 25, 2010

Related U.S. Application Data

(60) Provisional application No. 61/082,683, filed on Jul. 22, 2008.

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| A63F 13/30 | (2014.01) |
| A63F 13/40 | (2014.01) |
| G06Q 30/02 | (2012.01) |

(52) U.S. Cl.
CPC ............... *A63F 13/12* (2013.01); *A63F 13/10* (2013.01); *G06Q 30/02* (2013.01); *A63F 2300/5566* (2013.01); *A63F 2300/57* (2013.01)

(58) Field of Classification Search
USPC .......................... 463/1, 16, 20, 21, 22, 25, 42
See application file for complete search history.

(56) References Cited

U.S. PATENT DOCUMENTS

| | | | |
|---|---|---|---|
| 6,302,792 B1 | 10/2001 | Arai et al. | |
| 2003/0114218 A1* | 6/2003 | McClintic | ....................... 463/25 |
| 2006/0148545 A1 | 7/2006 | Rhyne, IV | |

(Continued)

FOREIGN PATENT DOCUMENTS

| | | |
|---|---|---|
| CN | 1981881 | 6/2007 |
| JP | 2000093648 A | 4/2000 |
| JP | 2000126448 A | 5/2000 |
| JP | 2004-105444 | 4/2004 |

OTHER PUBLICATIONS

Jasper Brownrigg, "Magicians" downloaded Mar. 31, 2009 from http://www.playgenesis.com.

(Continued)

*Primary Examiner* — Adetokunbo O Torimiro
(74) *Attorney, Agent, or Firm* — Ingrassia Fisher & Lorenz, P.C.

(57) ABSTRACT

Systems and methods are provided to implement a technique for generating interactive events in a simulation, such as creating encounters in an online computer game. In one implementation, encounters are created based on the players and the environment and allow for interaction that is different for different players. Players can select encounters for interaction and choose how to handle the encounter. Encounters may have one or more objectives for participating players to resolve. The objectives for the same encounter may be different for different characters depending on the characteristics of the player characters. If multiple player characters interact with the same encounter, they may each be presented with different objectives, some or all of which may be competing. In addition, the objectives for an encounter may change depending on how other objectives are resolved.

32 Claims, 5 Drawing Sheets

(56) References Cited

U.S. PATENT DOCUMENTS

| | | |
|---|---|---|
| 2007/0087798 A1 | 4/2007 | McGucken |
| 2007/0111804 A1 | 5/2007 | Sekimori |
| 2007/0129148 A1* | 6/2007 | Van Luchene ............ 463/42 |
| 2009/0053681 A1 | 2/2009 | Shen et al. |

OTHER PUBLICATIONS

Wikipedia, Definition of "Nonlinear gameplay" downloaded Mar. 31, 2009 from http://en.wikipedia.org/wiki/Nonlinear_gameplay.

Starhammer, "My idea of a cool mission", posted Apr. 23, 2008 from http://forums.champions-online.com/showthread.php?p=125179#post125179; also located at http://forums.startekonline.com/archive/index.php/t-3741.html.

Alec Meer, "Call of Duty: The MMO" dated Mar. 5, 2008 downloaded from http://www.rockpapershotgun.com/2008/03/05/call-of-duty-the-mmo/.

Kelly Heckman, "Jumpate Episode II: Attack of the Conflux", posted Jun. 27, 2003 downloaded from http://apb.warcry.com/news/view/57693.

* cited by examiner

SYSTEM AND METHOD FOR SELF-EVIDENT MULTIUSER CONTENT

CROSS-REFERENCE TO RELATED APPLICATIONS

This application claims benefit of U.S. Provisional Patent Application Ser. No. 61/082,683, filed Jul. 22, 2008, entitled "Self-Evident Multiplayer Content", and herein incorporated by reference in its entirety.

BACKGROUND

Massively multiplayer online ("MMO") games enjoy tremendous popularity, with some games numbering players in the hundreds of thousands or even millions. Such games' players typically control one or more player characters; as a player plays the game, their player character generally increases in ability and power. These character attributes are often encapsulated in the form of a character level, which is a number that increases with character experience, and which is a general indication of the ability of the character in combat, defense, or the like. In these prior systems, character levels, or other indicators of character abilities, are often caused to increase based on player accumulation of "experience" or other such points.

One way of accumulating experience or other such points is via completion of quests, raids, attacks, or other tasks defined by the system. In many of these ways, a player character interacts with an indicated non-player character (or other environmental feature) and receives a goal, the completion of which requires an interaction with the environment and/or non-player characters, and the performance of the same yields a reward as well as experience points.

SUMMARY

Certain implementations of the system and method provide ways to arrange "encounters" of users with goals or objectives, such as for player characters in a simulation such as an MMO. In an MMO implementation, the encounters can be with non-player characters or with features of the game environment itself, or both, as well as with other player characters. Player characters are presented with objectives but not generally by accepting them from a non-player character. Rather, player characters happen upon "encounters" in the course of the MMO, and the player character has the choice of taking part in the encounter.

Encounter creation, presentation, and management can be handled in various ways. In one implementation, encounters in the world incorporate objectives that are contextually sensitive to the observing character, and which drive game play and rewards based on their context. Multiple objectives may be presented, which may differ for different classes of characters, and may even be competing objectives. Objectives may be displayed on a user interface in the form of an "objective icon". Typical categories of objectives may be: attack, protect, interact, or transport. For example, an armored car may drive down the road, and an encounter may be initiated where "bad" characters may be offered an objective to rob the car while "good" characters may be offered an objective to protect it. These objectives are presented as icons over the armored car, and in this way invite the player character to take part. If the player character clicks the icon, the view may switch to a special view that preferentially portrays events of the encounter.

As a player character progresses through the environment, different encounters and objectives can be presented that give the player opportunities for new activities. The player may elect to interact with some and ignore others.

Many variations are possible. For example, as the encounter plays out, objectives may change or evolve, especially as certain objectives become moot or impossible to achieve. For example, if in the above example the armored car is destroyed, villain characters may be presented with new objectives about stealing the money in the car, while hero characters may be presented with new objectives about returning the money to the bank and/or saving the driver. However, saving the armored car itself may no longer be presented as a viable objective. In some cases, if a player character waits too long, other player characters will have stepped in and certain encounter objectives may be no longer available. Some encounters may be very simple (robbing an ATM) while others are highly complex (a gang fight between heroes and/or police and criminals). World events (holidays or the like) can also give rise to special types of encounters.

Implementations of the system and method can be configured to spawn an encounter of a given type based on a number of monitored variables, including: number and level of players in an encounter zone, as well as the number of encounters the zone has recently had, i.e., either a spatial or temporal density of encounters. Other variables may also be used. The system may base encounters on whether the player character appears to be just traveling through a zone or whether the player character is actively looking for encounters.

In one aspect, the invention is directed toward a computer-readable medium, including instructions for causing a processor in an electronic device to perform a method of providing gameplay opportunities for a player character in a simulation, the simulation including a plurality of player characters and non-player characters. The method includes: calculating a player character population or density, the player character population or density proportional to one or more of the following: a number of player characters, a density of player characters, or a level of player characters; calculating an encounter population or density, the encounter population or density proportional to one or more of the following: a number of encounters that have occurred in a predetermined time period prior to the calculating, or a number of encounters currently occurring; selecting an encounter based on the calculated player character population and calculated encounter population; and transmitting a signal to a client computing device, the signal causing a rendering of an indication of the encounter on a user interface of the client computing device.

Implementations of the invention may include one or more of the following. The rendering an indication may include rendering an objective icon on a display screen of a user or rendering an on-screen indicator on a display screen of a user. The simulation may be a multiplayer online game. The calculating may include calculating a player character or encounter population relative to a given area. The selecting may include selecting an encounter based on an occurrence of world or special events in the simulation. The selecting may include receiving a signal from a scheduler module. The selecting may include selecting a location for the encounter. The selecting a location may include selecting a location away from the location of one or more other encounters. The selecting a location may include selecting a location such that a probability for any potential location is directly proportional to one or more of the following game variables: the number of player characters in the zone, the density of player characters in the zone, the level of player characters in the zone, or the occurrence of special events in the simulation in the zone, or inversely proportional to the number of encounters that have occurred in a predetermined time period in the zone prior to the calculating. The rendering an indication may include rendering an objective icon on a display screen of a player. The rendering an objective icon on a display screen of a player may include: rendering a first objective icon on a display screen of a first player; rendering a second objective icon on a display screen of a second player. The first and second objective icons may be associated with objectives to be attempted by first and second player characters associated with the first and second players, respectively. The selecting may further include selecting the first and second objectives based on one or more player characteristics of the first and second player characters, respectively. The first objective may be different from the second objective. The method may further include, during a progression of the encounter, sending a signal to the client computing device, the signal causing a rendering of another objective icon on a display, the another objective icon corresponding to a new objective which may be attempted by the first or second player character. The new objective may be selected based on, at least in part, the first or second objectives. The new objective may be selected based on, at least in part, one or more actions performed by one or more player characters during the progression of the encounter. The new objective may be selected based on, at least in part, one or more actions performed by the first or second player characters during the progression of the encounter. The calculating may include calculating the dwell time of a player character in a zone or a number of encounters a player character has taken part in while in the zone.

In another aspect, the invention is directed toward a computer-readable medium including a system for providing gameplay opportunities for a player character in a multiplayer online game, the multiplayer online game including a plurality of player characters and non-player characters. The medium includes the following modules: a database module for storing data about a plurality of player characters, a plurality of non-player characters, a pool of potential encounters, and a plurality of features in a game environment; a player character and encounter population calculating module for calculating a number of player characters and encounters, or both, in a given area of a game environment; and an encounter selection module for selecting an encounter from the pool of potential encounters based at least in part on information from the population-calculating module.

Implementations of the invention may include one or more of the following. The medium may further include a scheduler module for providing information to the encounter selection module about events occurring in the game, where the encounter selection module selects an encounter based at least in part on the event information. The event information provided by the scheduler module may correspond to calendar events. The event information provided by the scheduler module may correspond to additional encounters to be added to the pool of potential encounters. The additional encounters may replace all or at least a portion of the encounters in the pool of potential encounters. The medium may further include a difficulty range module for providing information to the encounter selection module about an appropriate difficulty range for a selected encounter. The medium may further include a lifespan timer module for resolving an encounter based on expiration of a time period.

Advantages of the invention may include one or more of the following. Players may be provided with encounters in which they may choose to take part. The encounters may be identified by objective icons, and objectives may differ for different players. By taking part in the encounter, players are given gameplay opportunities, as well as opportunities for rewards and character enhancement. As the encounter plays out, objectives presented to characters may change, adapt, adjust, or evolve. Encounters may be created based on current system or game information, e.g., a number of players in the area.

DETAILED DESCRIPTION

Figure 1:
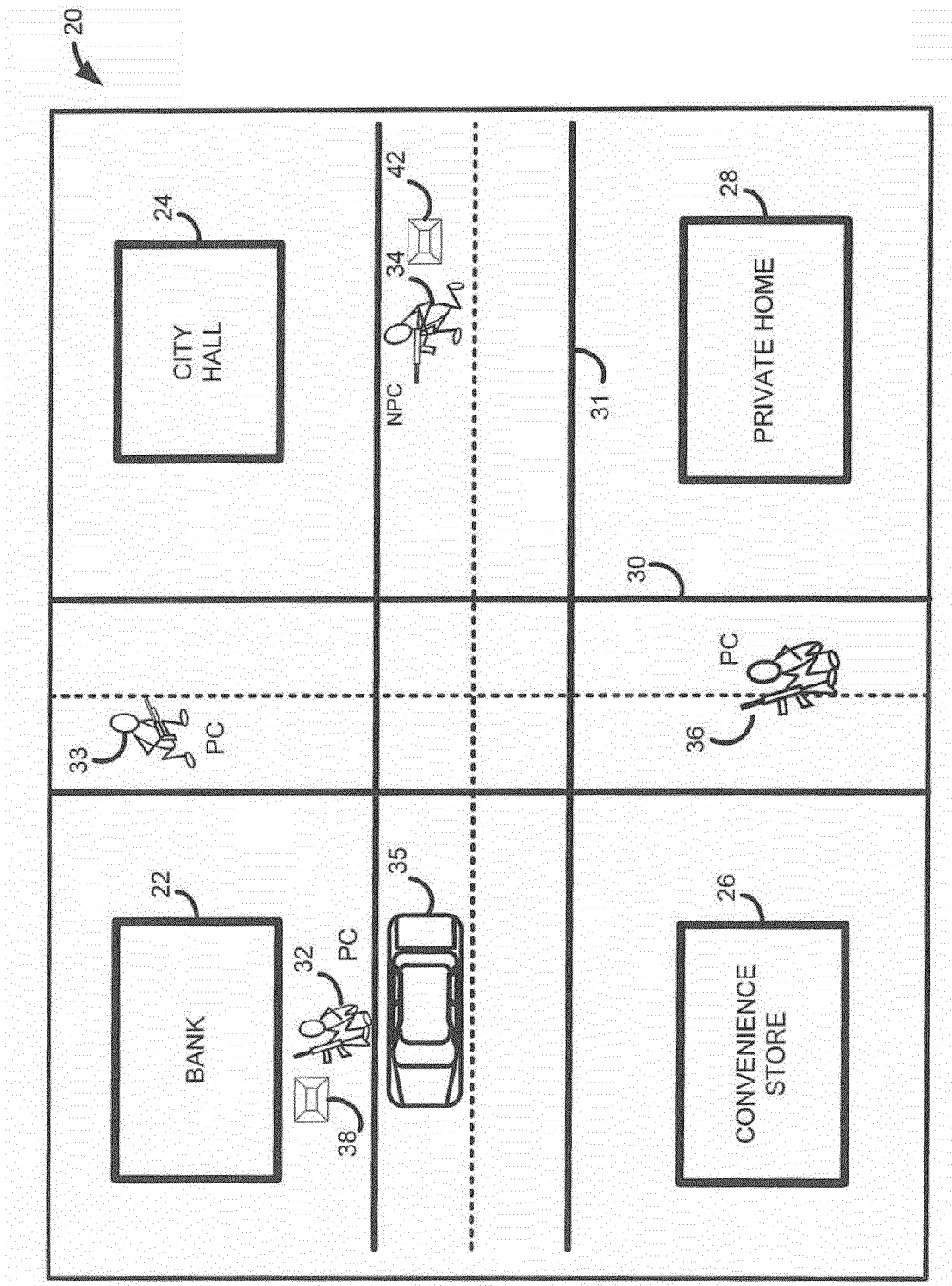
FIG. 1 illustrates an exemplary environment of the simulation, e.g., a multiplayer game, illustrating player characters, non-player characters, and features that make up the game.

Referring to FIG. 1, an exemplary environment of the simulation, e.g., a multiplayer online game, is illustrated. The environment may vary widely, and may be, e.g., a fantasy simulation, a science fiction simulation, a space simulation, a real world simulation, a city simulation, an apocalyptic simulation, a superhero simulation, and so on. The exemplary simulation of FIG. 1 shows a number of characters 32, 33, 34, and 36, and the same are shown traversing various streets 31 and 35 within a game environment 20. In FIG. 1, the characters 32, 33, and 36 are intended to portray player characters, controlled by players. The same interact with other players' player characters as well as with computer-controlled characters, termed non-player characters. The character 34 is intended to portray a non-player character, controlled by the simulation or game engine. That is, a non-player character is controlled by the simulation, either at the server level or by the client software, and the same acts in a way dictated by the software instructions and data set for that non-player character. A player may interact with the non-player character 34 by clicking on or otherwise activating the non-player character 34, or on an icon 42 associated therewith.

A number of city features are also shown, such as a bank 22, a city hall 24, a convenience store 26, and a private home 28. The features will vary according to the applicable game environment. An objective icon 38 is indicated adjacent the bank 22. An objective icon 42 is also indicated adjacent the non-player character 34. The user may click on these objective icons 38 and 42 to take part in encounters associated with the bank or the non-player character 34, respectively. Such encounters are described in greater detail below.

While these objective icons are displayed as simple buttons, their geographical form may vary, from the simple to the complex, and can further vary to be contextually sensitive and/or based on the viewing player or associated player character. The same may further be configurable by the player.

Figure 2:
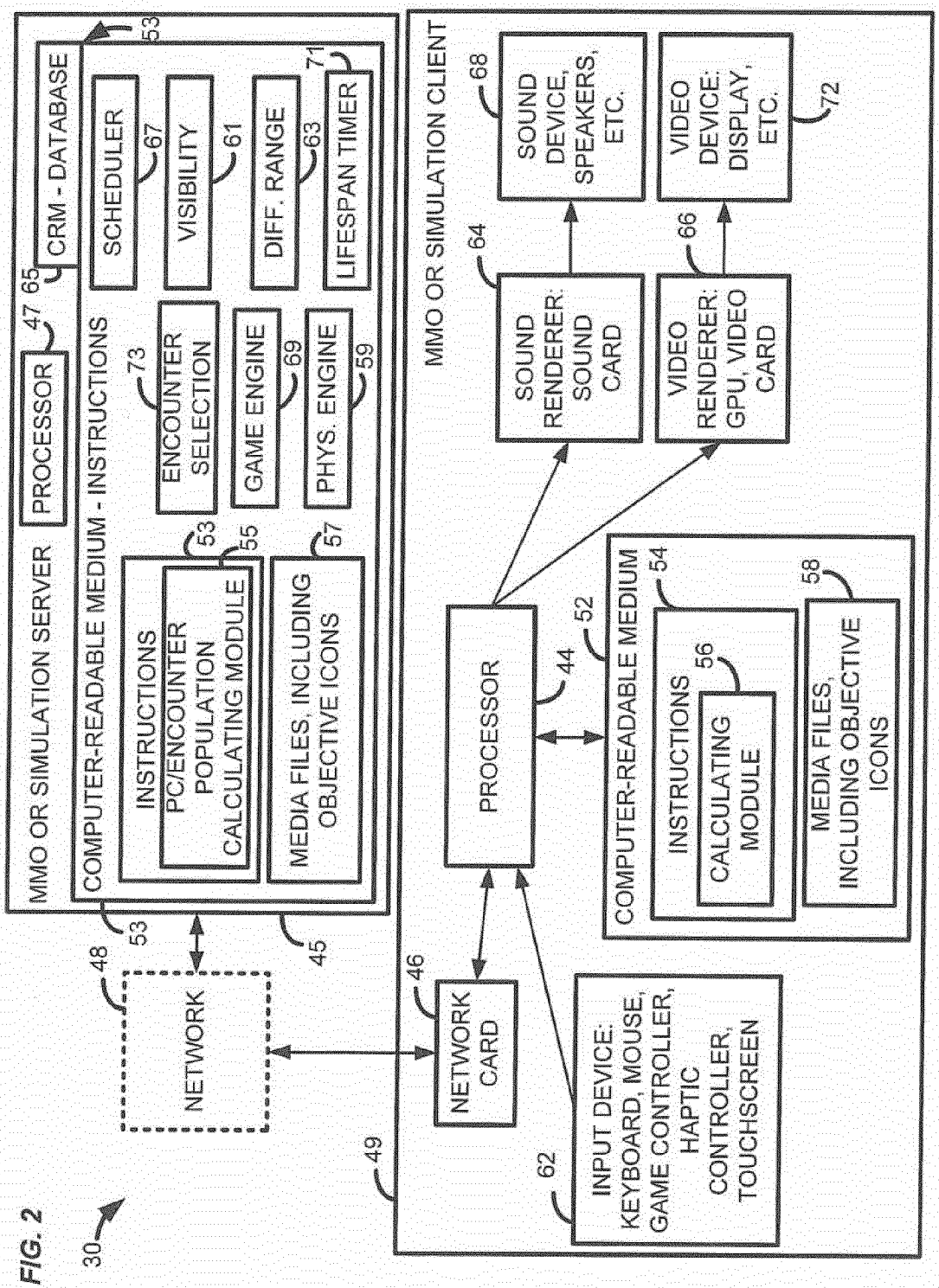
FIG. 2 illustrates a logical diagram of a system that may be employed to implement a simulation such as a multiplayer game, employing a client/server architecture.

FIG. 2 illustrates a logical diagram of a system 30 that may be employed to implement a simulation such as a multiplayer game. The system 30 includes an MMO or simulation client computing device 49 and an MMO or simulation server 45 which communicate by way of a network 48. The client computing device 49 includes one or more processors 44 which communicates with the network 48 via a network card 46 or via a network-enabled processor (not shown). The client computing device 49 has client software running which enables communication with the network 48 and server 45.

The client computing device 49 includes at least one input device 62, which may include a keyboard, mouse, game controller, haptic controller, touchscreen, or any other devices which may provide an input to a computer. The client computing device 49 further includes a computer-readable medium 52, such as a hard drive, flash memory, solid state drive, or the like, which stores instructions 54 for the processor 44, including calculating module 56.

The computer-readable medium 52 may also store media files 58, including graphics files, cinematics files, and media files for cut scenes. These media files may also be streamed when needed from the server 45. In some implementations, certain media files may be downloaded to the client, especially those that are often used, and others may be kept at the server for later streaming, to avoid cluttering the client system. Certain media files are may also be cached at the client system, such as those pertaining to the immediate game locale of the player character. The media files stored may also include files corresponding to objective icons.

The system 30 also includes a sound renderer 64, such as a sound card, by which signals pertaining to game sounds may be put in a form suitable for playing on a sound device 68, e.g., computer speakers. Moreover, the system 30 also includes a video renderer 66, such as one or more GPUs or video cards, or both, by which signals pertaining to game video may be put in a form suitable for playing on a video device 72, e.g., a computer display.

The simulation server 45 controls the game, and may be a game server having one or more processors 47 and running a game engine 69 and other components, including a physics engine 59, user interface, input/output components, a database 65, and the like. Certain or all of these components or modules may be implemented on a computer-readable medium 51, which includes instructions 53 for carrying out these and other processes, including a module 55 for calculating player character and encounter populations. The computer-readable medium 51 may also include media files 57, including objective icons, for downloading or streaming to client computing devices 49.

The computer-readable medium 51 may also include modules that serve special purposes in the systems and methods described here. These include a scheduler module 67 for scheduling in-game and world events, a visibility module 61 for generating encounters or portions thereof about special or particular non-player characters, a difficulty range module 63 for generating information pertaining to an appropriate difficulty of an encounter given the player characters in the area, and a lifespan timer module 71 for timing out an encounter if efforts are not being made to resolve it. The functions performed by these modules are described in more detail below. The computer-readable medium 51 may further include an encounter selection module 73 for selecting an encounter based on information from the player character and encounter population calculation module 55 as well as from modules 67, 61 and 63. Not all of these modules need be involved in any given implementation.

Figure 3:
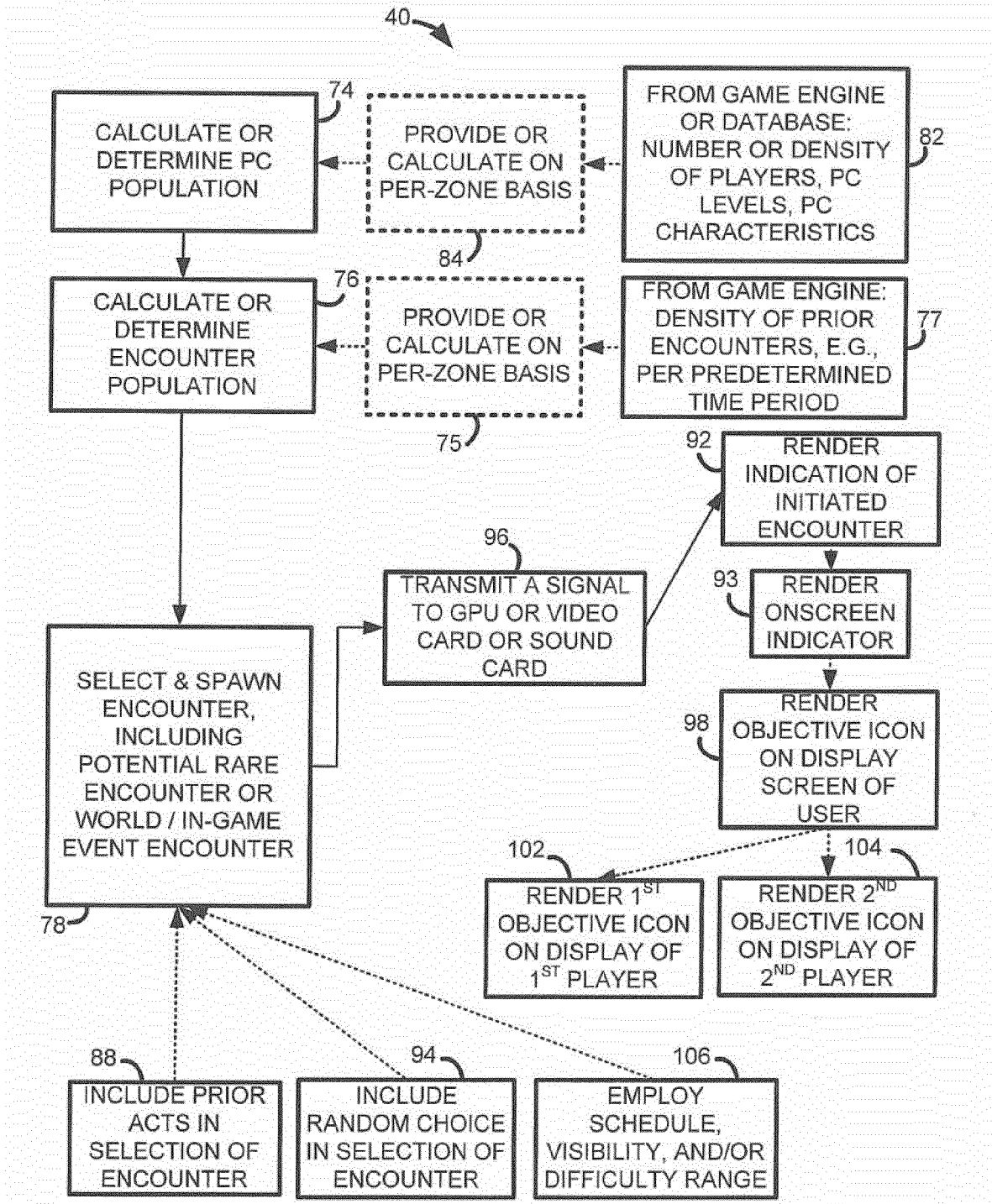
FIG. 3 is a flowchart of a method for implementing an embodiment of the invention.

FIG. 3 is a flowchart of a method 40 for implementing a system and method for providing encounters in a simulation such as an MMO. Briefly, encounters act as targets of opportunity and may range from the very simple, e.g., a robbery at an ATM or storefront, up to a complex multi-character scenario, e.g., a gang involved in a gun battle with police. The encounters may vary in complexity and theme, but each generally is spawned, has a sequence of actions, and then resolves.

The encounter system determines in part what players see when they move through the game environment. The game environment may be divided into a series of zones, and each zone may contain encounters for players of all levels and factions. By use of the encounter system, users may find new content even in zones they have previously explored, thus maintaining interest in the area. To accomplish this, encounters are triggered in ways that keep the zone from appearing too static or too random. The encounter system works by in part monitoring the player character population in the zone, as well as the population of spawned encounters. The population data is then employed to trigger encounters, as is described in greater detail below. Special varieties of encounters may also be spawned, such as "rare" encounters as well as encounters that are added as needed for in-game or world events.

Various factors may be employed by the system in providing encounters. Initially it is noted that encounters may be optional for player characters—the player may choose to take part in them or not. A player may elect to not engage the encounter or other players may consume or start the encounter first. This may not necessarily preclude other players from engaging the encounter; however, in some cases it may mean that the encounter objectives may change or evolve according to how the encounter is progressing. Once spawned, an encounter will resolve itself as it progresses, or the same may expire if player characters fail to follow the encounter through to completion. The encounter-spawning system need not further control the progression of the encounter; the system may simply track whether or not a spawned encounter is present in an area, so as to prevent over-spawning or bunching of encounters.

A first step of the method 40 is to calculate or otherwise determine a player character population or density value for a simulation, such as an MMO (step 74). This value may be based on a number of factors, including data such as: player character count, player character faction, and other factors. The calculation algorithm may then select from a range of encounters that best fit the player character population. In more detail, one or more of the following factors may be determined or employed (step 82): player character count or density, which may determine which size encounter to select; player character movement type, which may determine ease of access to vertical encounters; player character level, which may determine which level encounter to select; player character faction, which may determine the type or theme of encounter to select; the player character group status, which may determine whether the player character is grouped or is playing solo; the time in the area or zone, which determines and quantifies the time each player character has spent in an area; and the number of encounters a player character has actually engaged during their time in the area. The last two factors may be employed to determine the "dwell time" for a player character, i.e., in order to determine whether a player character is just passing through a zone or if they are actively looking for encounters, e.g., the calculation may further take into account the number of encounters the player character has taken part in while in the zone. For several of the above factors, the player character population or density may be calculated on a per-area basis, e.g., per zone, per multi-zone area, per world, or the like (step 84).

Additional factors related to player character population may also be employed in some implementations. For example, the system and method may take into account the skills, attributes, factions, abilities, statistics, and characteristics of the player characters in the zone or area, their status, or their identity. In some implementations, even more detailed information may be taken into account, such as the player characters' attack power, armor level, special powers, grouping status with other player characters, or the like. In this way, even more appropriate content may be provided. For example, if many player characters in a zone have a flying ability, an encounter may be spawned that requires flying to successfully resolve.

A next step of the method 40 is to calculate or otherwise determine an encounter population or density (either temporal or spatial) value for the MMO (step 76). For example, since player characters may travel throughout the game environment, certain factors may be employed (step 77) to ensure that encounter events are distributed and provide a level of variation. As with the population density, for several of the factors below, the encounter population or density may be calculated on a per-area basis, e.g., per zone, per multi-zone, per world, or the like (step 75).

One factor is that the system and method may track encounter usage, which assists in keeping content dynamic and novel. Other factors include: the proximity of active encounters, which prevents cluttering of encounters, both in a horizontal sense as well as in a vertical sense; active encounter types, which provides a mix of types of encounters; recent encounters, which prevents encounters from repeating in the same area; and frequency of encounters, which promotes variety in the overall pattern of encounters.

If the calculation of population and encounter density or numbers determines that an encounter is appropriate, an encounter may be selected using the encounter selection module 73 and subsequently spawned (step 78).

The selection of which encounter is spawned may be made such that the number and level of player characters is appropriate for the encounter. Other factors may also be included in the selection of encounters, these serving to alter or affect the nature of encounter content in an area. A first factor that may affect encounter content are prior acts of the player characters in the area (step 88). If one or more player characters have already seen or experienced certain encounters, alternate encounters may be selected to spawn, so as to keep the content new for the most number of players. Another factor is randomness (step 94). If a number of encounters are appropriate for a given player character population and encounter density, a random choice may be made amongst the potential encounters.

Other factors that may affect encounter content are the game environment schedule, visibility of certain non-player characters, and difficulty ranges of encounters (step 106). Data pertaining to these factors may be calculated or obtained by the corresponding server modules in FIG. 2. In more detail, one factor that may affect encounter content is the schedule of the game environment, as kept by the scheduler module, and which may be employed to direct the encounter system to specific datasets or encounters, such as those pertaining to world or in-game events or rare encounters. Rare encounters may appear in one or more zones, and may include appearances from particular predetermined non-player characters or other such significant scenarios. They may offer special gameplay and rewards, and such scenarios encourage players to visit different areas frequently. In-game events, which often correspond to some degree with world events, may transition into and out of the game environment and may give rise to special encounters. The scheduler module notifies the game environment when such an event is to occur, e.g., based on factors such as the time since the last event, the time of day or year, any special non-player character or player activity, or the like. These events may be, e.g., zone-wide, multi-zone-wide, game-environment-wide, and may change the population of an area, in some cases replacing the same with different non-player characters and encounters or both.

In-game or world events may provide content to each player in the game, and may thus reference a pool of encounters similar in scale to normal zone content. During the event, the encounter system generates content from the pool of encounters based on the factors described above. When the in-game or world event concludes, the system returns to referencing its original pool of potential encounters. The original pool of potential encounters may be referenced to a zone, and may contain a list of encounters that can spawn within the zone. When a player character enters the zone, the scheduler may use data such as the player character's level, faction, current quests, or the like, and then choose the most appropriate encounter to spawn for that player. Even while one encounter is happening, players may see a series of side encounters in which they can also take part.

In some implementations, in-game or world events are preceded by a "build-up event" and followed by a "clean-up event". All three are constituted by different, though potentially overlapping, data sets that are referenced by the system when directed to do so by the schedule and scheduler module. The build-up event is a period of time prior to the event in which non-player characters, encounters, and clues help alert players to the arrival of the event. During the clean-up event, various fallout from the world event may be the subject of encounters.

Another factor that may affect encounter content is visibility, and is controlled and handled by the visibility module noted in FIG. 2, and in which special encounters are triggered as a response to a specific visibility rating of a non-player character, e.g., their fame or notoriety. A further factor includes difficulty ranges, controlled and handled by the difficulty range module noted in FIG. 2, and which provide a minimum and maximum difficulty in content that may be employed to emphasize certain areas or zones. Difficulty may be increased by, e.g., increasing the number and/or level of enemies trying to defeat the subject player character. Each of these factors may be embodied in a module or other routine on the game server, as discussed above.

In one implementation, within a given zone, content-designated areas may be defined, which are geographical boundaries within which encounters may occur having a certain type, level, faction, and difficulty of content. Content designated areas are contained within zones, which are in turn contained within regions. Within a content designated area, content markers may be used to specify specific contexts appropriate to a city block or terrain area, e.g., an alley, roof, intersection, side-walk, or doorway. In this implementation, encounters are marked with a specific designation that the content scheduler uses to spawn them only at the proper content markers.

Once an encounter has been selected and spawned, a signal may be transmitted to a GPU, video card, or sound card, to indicate the initiation of the encounter (step 96). The initiated encounter is thus rendered (step 92) in a way that a user may then visualize or hear. In the example discussed above, an armored car may appear in the zone, and the same is then a rendering of the initiated encounter.

In one implementation, players may identify potential encounters by having a onscreen indicator appear on their display (step 93). When players see the same, they may press a key or button and are then directed towards the nearest encounter via a shift in their view or camera and perspective.

The onscreen indicator step (step 93), if used, may then lead to objective icons being displayed. However, potential encounters may also be indicated by directly causing the rendering of an objective icon on a display screen of the user (step 98), and this step may include rendering a first objective icon on the display of a first player (step 102) and rendering a second objective icon on the display of a second player (step 104). The first and second icons may differ, and the choice of icon for a given player may depend on the level of the player, their faction if any, and other player characteristics, abilities, skills, attributes, or the like.

Figure 4:
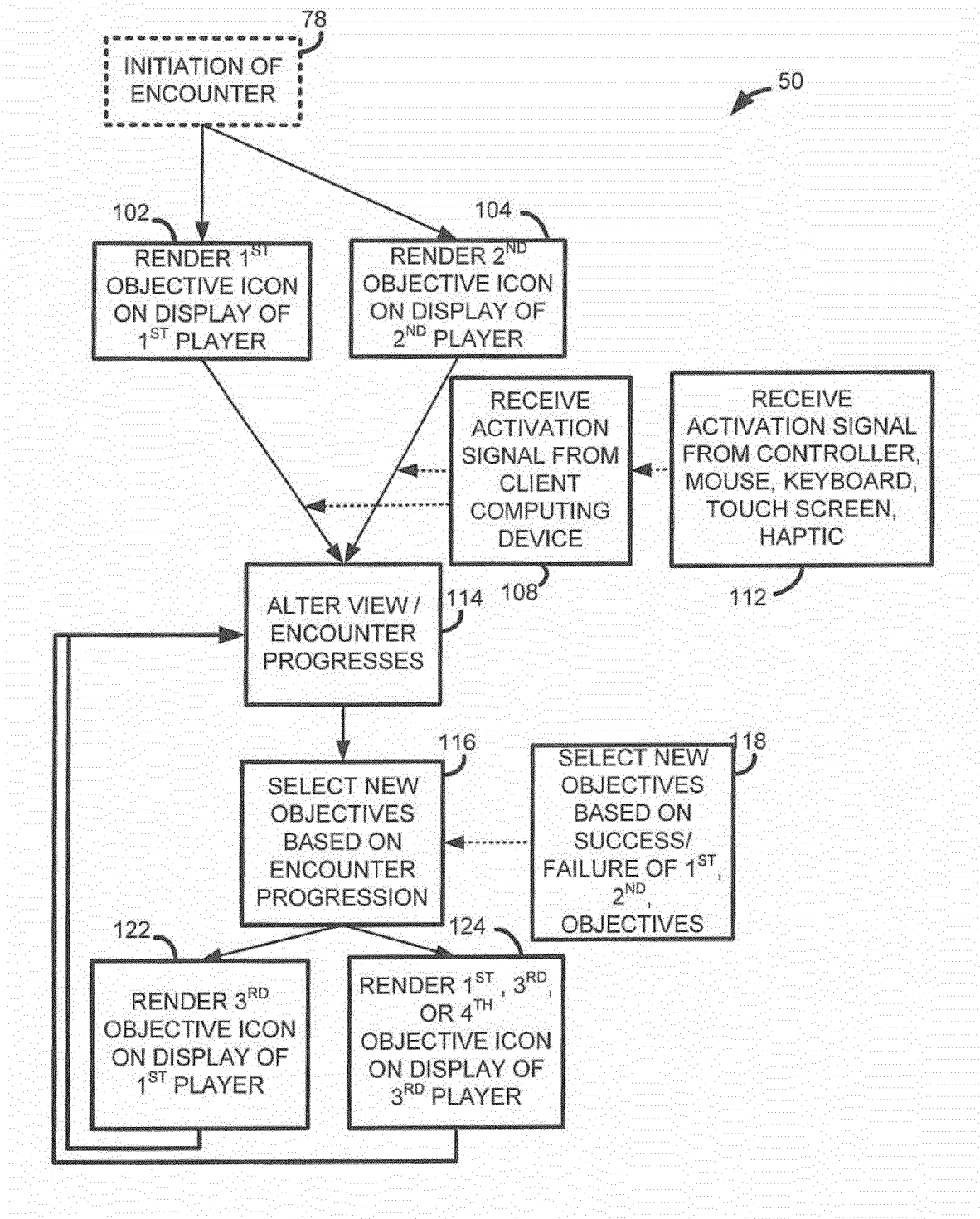
FIG. 4 is a flowchart of a method for implementing another embodiment of the invention, in particular illustrating how objectives may evolve or change as play progresses.

FIG. 4 is a flowchart of a method 50 for implementing another embodiment of the invention, in particular illustrating how objectives may evolve or change as play progresses. Certain of the method steps are the same as in FIG. 3, and the same reference numerals are thus employed.

As noted above, an encounter may be initiated (step 78), and objective icons may be displayed on a display screen of the user, and this step may include rendering a first objective icon on the display of a first player (step 102) and rendering a second objective icon on the display of a second player (step 104).

If no players take part in the encounter, the encounter will terminate, e.g., by use of an encounter lifespan timer. That is, in some implementations, objectives are timed and need to be completed before they expire. To implement an expiration, an objective, as well as an overall encounter of which the objective is a part, may incorporate a lifespan timer module. The objective's type and time may be indicated within the objective icon that floats above the subject of the objective, e.g., a vehicle, building, or non-player character.

If a player takes part in an encounter by activating or clicking on an objective icon, or other activation signal, then the server receives an activation signal from the client computing device (step 108), and the encounter is initiated. The step of receiving an activation signal from a client computing device may include receiving an activation signal as caused by activation of an input device, such as a game controller, mouse, keyboard, touch screen, haptic controller, or the like (step 112).

Once an activation of an encounter occurs, the encounter may continue and progress (step 114). This step also includes potentially changing the view of the player to a more encounter-centric view. The lifespan timer may be reset, but may still be used to ensure that player characters continue to make progress on the encounter. For example, once an objective appears in the game environment, a lifespan timer may begin counting down, and players may be provided with only a limited amount of time to engage and resolve objectives. Once a player engages an objective, thus engaging the encounter, the lifespan timer is paused. If the player stops engaging the objective, the lifespan timer may resume its countdown. If the timer reaches zero, the objective and/or encounter may despawn.

Once a user activates an encounter, their view may be caused to switch to a more revealing view of the encounter. In this sense, their user interface is controlled at least temporarily by the system in such a way as to focus the player's attention on the encounter. Following that temporary removal of control, the user may alter their view as they did previously. In another implementation, the user may alter their view, but their overall point of view stays on the encounter, at least while the encounter is active. In this way, the encounter is akin to an in-game instance that many players can take part in, so long as the encounter is appropriate for their level, faction, or the like. In some cases, of course, any player may be allowed to take part in any encounter.

As the encounter progresses, new objectives may be selected based on events that have occurred in the encounter (step 116). The new objectives may thus be, at least in part, based on the success or failure of the first or second objectives (step 118). A next step may be to generate and render a third objective icon on the display of the first player (step 122). In this way, the objective icon for the first player is seen to evolve, change, or alter as the encounter progresses, as certain actions become moot or other actions become possible. Similarly, the first, third, or a fourth objective icon may be generated by the server and rendered on a display of a third player (step 124). In this way, a third player, i.e., a new player, who had not seen or taken part in the encounter previously, may see either the first objective icon, may see the evolved objective icon, i.e., the third objective icon, or may see an entirely new objective icon, i.e., a fourth objective icon. The entire encounter may then progress in this manner until completion or expiration.

Rules may be set for how and whether new players can take part in the encounter. For example, a rule may be set where at least a certain percentage of encounter content must remain before a player can engage the encounter. If less than that remains, the player may be prohibited from seeing objective icons; they may still the encounter, but they may not take part. If new players view the encounter but are unable to take part because of faction, level, difficulty range, or the like, they too will be prohibited from seeing the objective icons or other engagement devices.

Figure 5:
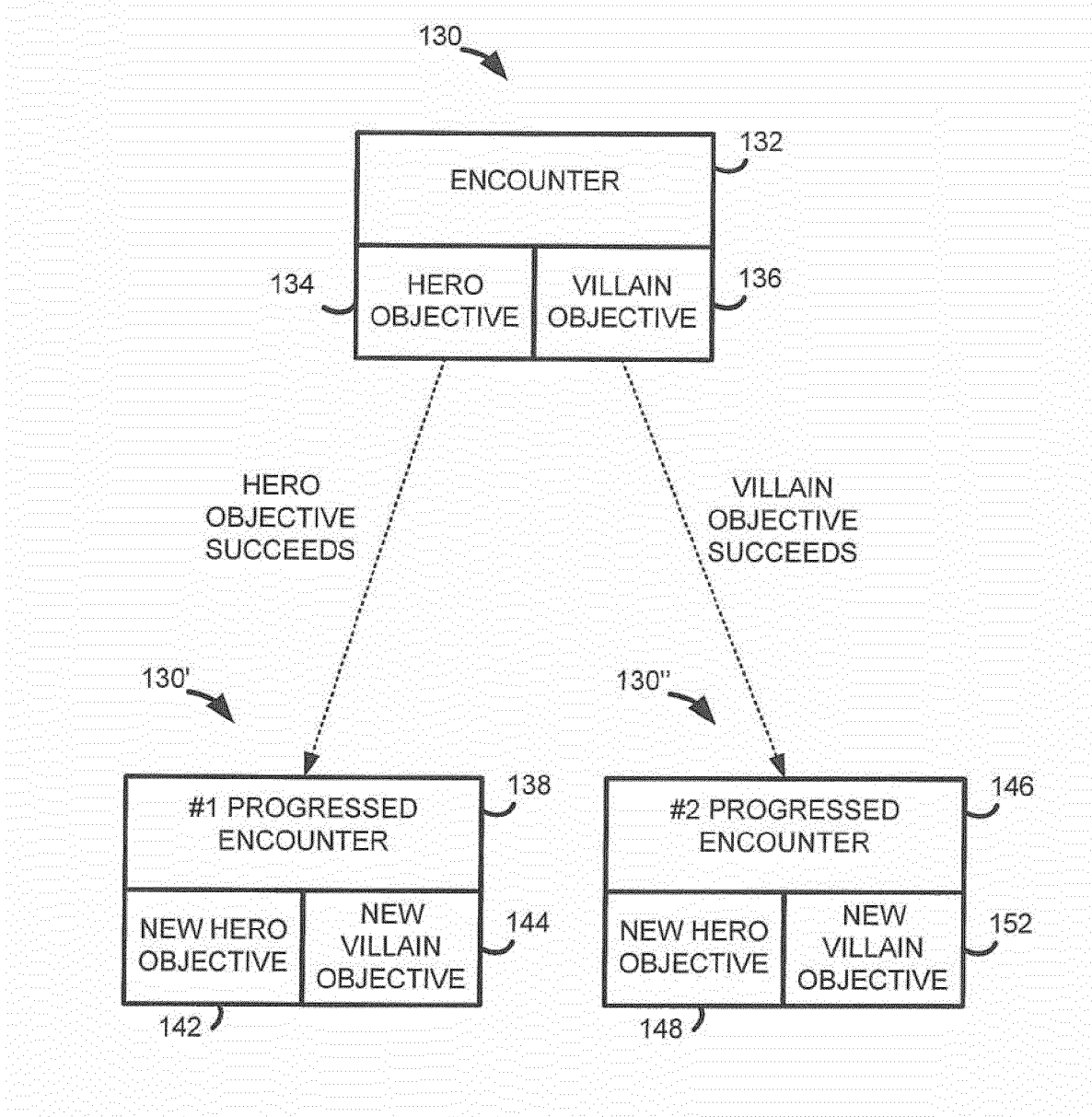
FIG. 5 illustrates evolution of objective icons as an encounter progresses.

FIG. 5 illustrates in a schematic way an evolution of objective icons as an encounter progresses. The game environment is shown in an initial state 130, where a potential encounter 132 has been spawned. For characters of one faction, illustrated as a "hero" faction, one objective 134 may be displayed. Similarly, for characters of a "villain" faction, a different objective 136 may be displayed. These objectives may be the same or may vary for characters having differing characteristics, even within the same faction. They may further differ even for player characters whose characteristics are alike, since encounters may employ different roles for different player characters, and these roles may be assigned in an arbitrary or random manner.

If the hero objective succeeds, then the path leading to a progressed encounter 138 with state 130' is followed. If the villain objective succeeds, then the path leading to a progressed encounter 146 with state 130" is followed. In some cases, a mixed result may occur, and the new objectives may reflect the mixed result. In state 130', the encounter has progressed to encounter 138, and a new hero objective 142 and new villain objective 144 are displayed. In state 130", the encounter has also progressed, but in a different way, to new encounter 146, and similarly a new hero objective 148 and new villain objective 152 are displayed.

Examples of objectives include "attack", "secure", "transport", and "protect". Attack objectives often include requiring the player character to attack or otherwise provide damage to an enemy. If the player character is forced to flee or is overly damaged, the objective lifespan timer will resume; if the player character does not re-engage the objective in time and the lifespan timer runs out, the player character will fail at the objective. The protect objective may be employed to prevent player character and virtual property damage. With the appearance of a protect objective, enemies in the vicinity may be caused to begin attacking a feature associated with the objective. The objective may then be defended until the attackers have been defeated. Once the objective is no longer in danger, a lifespan timer, e.g., a short duration one, may be started, letting players know the objective will soon complete.

If an enemy re-engages the objective before the lifespan timer finishes, then the timer stops and the enemy may again be required to be defeated before the timer begins again. For interact objectives, the actions of different objectives may vary, but the goal will generally require some form of interaction, such as a conversation with a particular non-player character. In one implementation, the player character may animate so as to appear as if they are talking. When a player engages with a manipulate objective, its lifespan timer pauses, and a completion timer may begin. If the player character is damaged or interrupted while interacting with the objective, their attempt will fail and they may be required to begin again. If the lifespan timer of the objective reaches zero before the item can be manipulated, the objective may fail. It is noted in this connection that some powers may allow player to manipulate targets from a distance. A transport objective requires a player to move a target from one location to another. When a transport objective appears and is activated by a player character, enemies in the area protecting the item to be transported may be caused to attack the player character. The player may receive instructions about where to transport the target, and a completion timer may start, showing the player how much time they have left to transport the target.

In some implementations, when an objective icon is activated or is targeted by a player, all of the currently-available icons pertaining to an encounter may appear. In this way, a player can quickly assess a situation and keep track of objectives during a battle. When an objective is completed or otherwise terminates, an update may be sent to players working on that objective or to all players. An encounter completion update may be transmitted to all participants once all of the objectives have been resolved or otherwise terminated, e.g., once the player has won, lost, been interrupted from completing the encounter, or where the encounter has a time limit that has expired.

Encounters may include a range of potential themes, scenarios, and scale. For example, some encounters may be mobile, while others may be static. One or more player characters and non-player characters may be or become involved. Some encounters may include so-called mini-games, where a player character must solve a game or puzzle to continue gameplay, e.g., rescuing an accident victim, lifting, carrying or transporting an object, opening a locked chest, or the like. Encounters may include vehicles, traffic, or the like. Encounters may vary in duration, e.g., from a quick robbery to an extended shootout. Encounters may vary in difficulty, even within a given level range.

Each instantiation of an encounter may be unique to the player and player character that it was spawned for, but the composition of the encounter may be identical across instantiations. The encounter may exists without the player being in the same location, but the same may, after a period of time, go away to conserve server resources. Another player, however, could stumble across an encounter spawned up for the originating player. So long as the player character meets the content criteria for that encounter, e.g., of an appropriate faction, the player character may be able to engage and complete the encounter. If the encounter is part of a quest or predefined task, they may only get credit for the quest if they were signed up to do the quest.

Objectives may evolve, alter, or change according to certain triggers, which may include the completion or expiration of an objective, when an objective reaches a specific point or destination, or other such triggers. Objectives may evolve by changing to a new objective, having the objective switch from a team of one faction to a team of another, or by the objective going from an active state to an inactive state.

EXAMPLE

For example, in a superhero-themed game environment, a hero player and a villain player may both view an armored car robbery encounter. Each will see objective icons that require hero or villainous action in order to complete the objective. The villain character may have an objective to destroy the armored car and if the villain character successfully destroys it, new objectives could be presented. For the guards that emerge from the wrecked car, the hero player could have a new objective icon appear over each guard to protect the guard. For the bags of money that fall from the car or are visible amongst the wreckage, the villain player could be presented with objective icons to steal each bag while the hero player could be presented with objective icons to return the bags to the bank. In another example, a character could create situations that open new encounters, e.g., destroying a wall to reveal the inside of a jewelry store providing a new encounter and opportunities for theft or aid.

What have been described are systems and methods for providing encounters by which gameplay in a simulation, i.e., the variety of acts, tasks, quests, battles, etc., that a player experiences in a game, may be made more interesting. Encounters may be based on density or number of players in a given area, as well as other factors.

One implementation of the system and method includes one or more programmable processors and corresponding computer system components to store and execute computer instructions, such as to provide the server and client systems to operate and interact in the online game environment, to monitor and control the data and interaction of non-player characters and player characters in the game environment, and to control and monitor the creation and handling of encounters and objectives in the game environment.

Additional variations and implementations are also possible. For example, the encounter system could be applied to other types of games, such as fantasy or science fiction games, or offline games. The encounter system could also be used to provide motivations for computer-controlled characters, presenting them with their own sets of objectives. Accordingly the scope of the invention is not limited only to the specific examples laid out herein.

The invention claimed is:

1. A non-transitory computer-readable medium, comprising instructions for causing a processor in an electronic device to perform a method of providing gameplay opportunities for a player character in a simulation, the simulation including a display of a plurality of player characters and non-player characters on a display screen of a client computing device, the method comprising:
   a. calculating a player character density, the player character density proportional to one or more of the following: a number of player characters or a level of player characters;
   b. calculating an encounter density, the encounter density proportional to one or more of the following: a number of encounters that have occurred in a predetermined time period prior to the calculating, or a number of encounters currently occurring;
   c. selecting an encounter based on the calculated player character density and calculated encounter density; and
   d. transmitting a signal to cause a video renderer or sound renderer in a client computing device to render an indication of the encounter on the display screen or by a sound device, respectively, of the client computing device.

2. The medium of claim 1, wherein the rendering an indication includes rendering an objective icon on the display screen of the client computing device.

3. The medium of claim 1, wherein the rendering an indication includes rendering an on-screen indicator on the display screen of the client computing device.

4. The medium of claim 1, wherein the simulation is a multiplayer online game.

5. The medium of claim 4, wherein the calculating of a player character density includes calculating a player character density relative to a given area.

6. The medium of claim 4, wherein the rendering an indication includes rendering an objective icon on a display screen of a first player.

7. The medium of claim 6, wherein the rendering an objective icon on the display screen of a player includes:
   a. rendering a first objective icon on the display screen of a first player; and
   b. rendering a second objective icon on a display screen of a second player;
   c. wherein the first and second objective icons are associated with objectives which may be attempted by first and second player characters associated with the first and second players, respectively.

8. The medium of claim 7, wherein the selecting further comprises selecting the first and second objectives based on one or more player characteristics of the first and second player characters, respectively.

9. The medium of claim 8, wherein the first objective is different from the second objective.

10. The medium of claim 8, further comprising, during a progression of the encounter, sending a signal to the client computing device, the signal causing a rendering of another objective icon on the display screen of the first player or of the second player or both, the another objective icon corresponding to a new objective which may be attempted by the first or second player character.

11. The medium of claim 10, wherein the new objective is selected based on, at least in part, the first or second objectives.

12. The medium of claim 11, wherein the new objective is selected based on, at least in part, one or more actions performed by one or more player characters during the progression of the encounter.

13. The medium of claim 12, wherein the new objective is selected based on, at least in part, one or more actions performed by the first or second player characters during the progression of the encounter.

14. The medium of claim 4, wherein the calculating of a player character density includes calculating the dwell time of a player character in a zone.

15. The medium of claim 4, wherein the calculating of an encounter density includes calculating and encounter density relative to a given area.

16. The medium of claim 4, wherein the calculating of an encounter density includes calculating a number of encounters a player character has taken part in while in the zone.

17. The medium of claim 1, wherein the selecting includes selecting the encounter based on an occurrence of world or special events in the simulation.

18. The medium of claim 17, wherein the selecting includes receiving a signal from a scheduler module.

19. The medium of claim 1, wherein the selecting includes selecting a location for the encounter.

20. The medium of claim 19, wherein the selecting includes selecting the location away from a location of one or more other encounters.

21. The medium of claim 20, wherein the selecting is such that a probability for any potential location is directly proportional to one or more of the following game variables: the number of player characters in a zone, the density of player characters in the zone, the level of player characters in the zone, or the occurrence of special events in the simulation in the zone, or inversely proportional to the number of encounters that have occurred in a predetermined time period in the zone prior to the calculating.

22. A non-transitory computer-readable medium, comprising instructions for causing a processor in an electronic device to perform a method of providing gameplay opportunities for a player character in a simulation, the simulation including a plurality of player characters and non-player characters, the method comprising:
   a. calculating a player character population, the player character population proportional to one or more of the following: a number of player characters or a level of player characters;
   b. calculating an encounter population, the encounter population proportional to one or more of the following: a number of encounters that have occurred in a predetermined time period prior to the calculating, or a number of encounters currently occurring;
   c. selecting an encounter based on the calculated player character population and calculated encounter population; and
   d. transmitting a signal to a client computing device, the signal causing a rendering by a video renderer or sound renderer in the client computing device of an indication of the encounter on a display screen or by a sound device, respectively, of the client computing device.

23. The medium of claim 22, wherein the rendering an indication includes rendering an objective icon on the display screen.

24. The medium of claim 22, wherein the selecting includes selecting the encounter based on an occurrence of world or special events in the simulation.

25. The medium of claim 24, wherein the selecting includes receiving a signal from a scheduler module.

26. The medium of claim 25, wherein the selecting includes selecting a location for the encounter.

27. The medium of claim 26, wherein the selecting includes selecting the location away from a location of one or more other encounters.

28. The medium of claim 27, wherein the selecting is such that a probability for any potential location is directly proportional to one or more of the following game variables: the number of player characters in a zone, the density of player characters in the zone, the level of player characters in the zone, or the occurrence of special events in the simulation in the zone, or inversely proportional to the number of encounters that have occurred in a predetermined time period in the zone prior to the calculating.

29. The medium of claim 22, wherein the rendering an indication includes rendering an objective icon on the display screen of a first player.

30. The medium of claim 29, wherein the rendering an objective icon on the display screen of a player includes:
   a. rendering a first objective icon on the display screen of a first player; and
   b. rendering a second objective icon on a display screen of a second player;
   c. wherein the first and second objective icons are associated with objectives which may be attempted by first and second player characters associated with the first and second players, respectively.

31. The medium of claim 30, wherein the selecting further comprises selecting the first and second objectives based on one or more player characteristics of the first and second player characters, respectively.

32. The medium of claim 31, wherein the first objective is different from the second objective.

* * * * *